Oct. 15, 1929.  W. APFELBAUM  1,731,240
APPARATUS FOR AND PROCESS OF MOLDING PLASTIC MATERIAL
Filed July 2, 1920  3 Sheets-Sheet 2
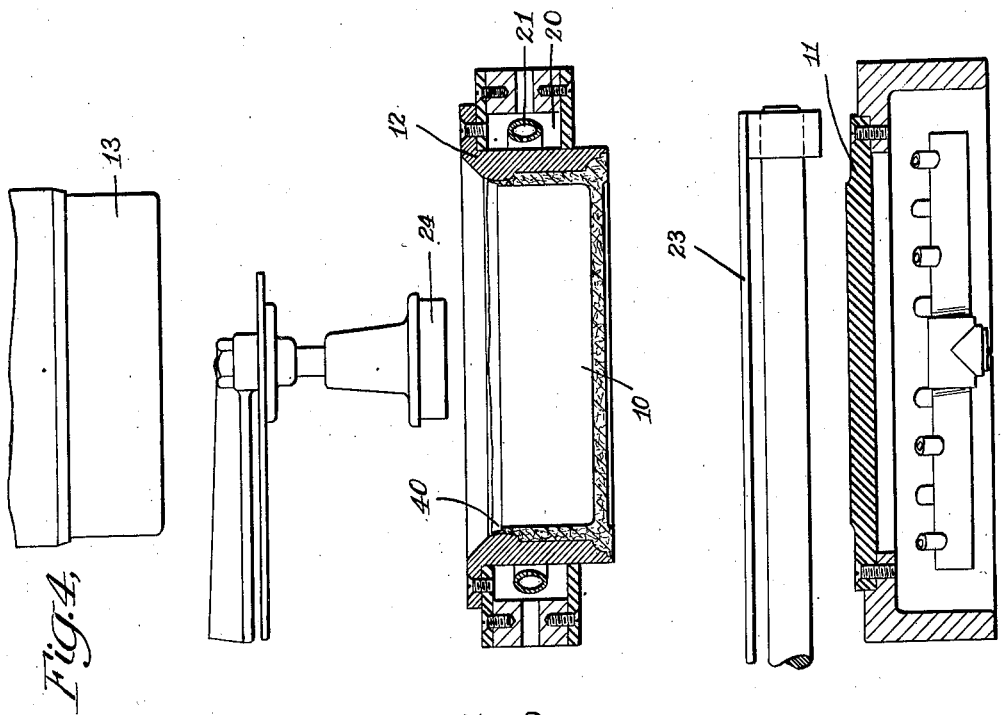
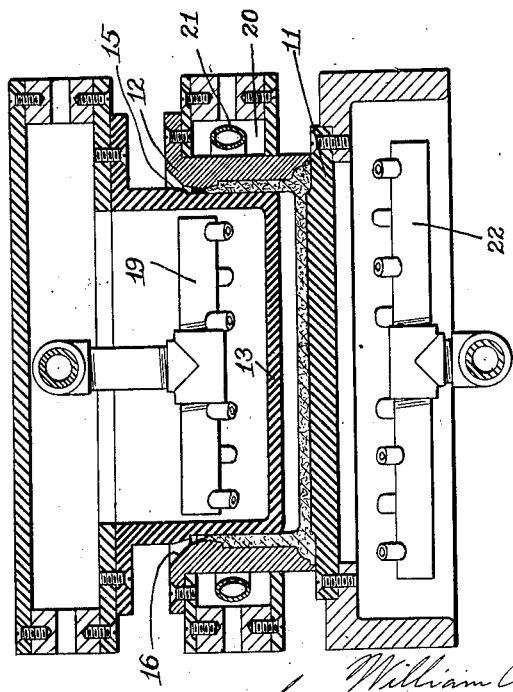

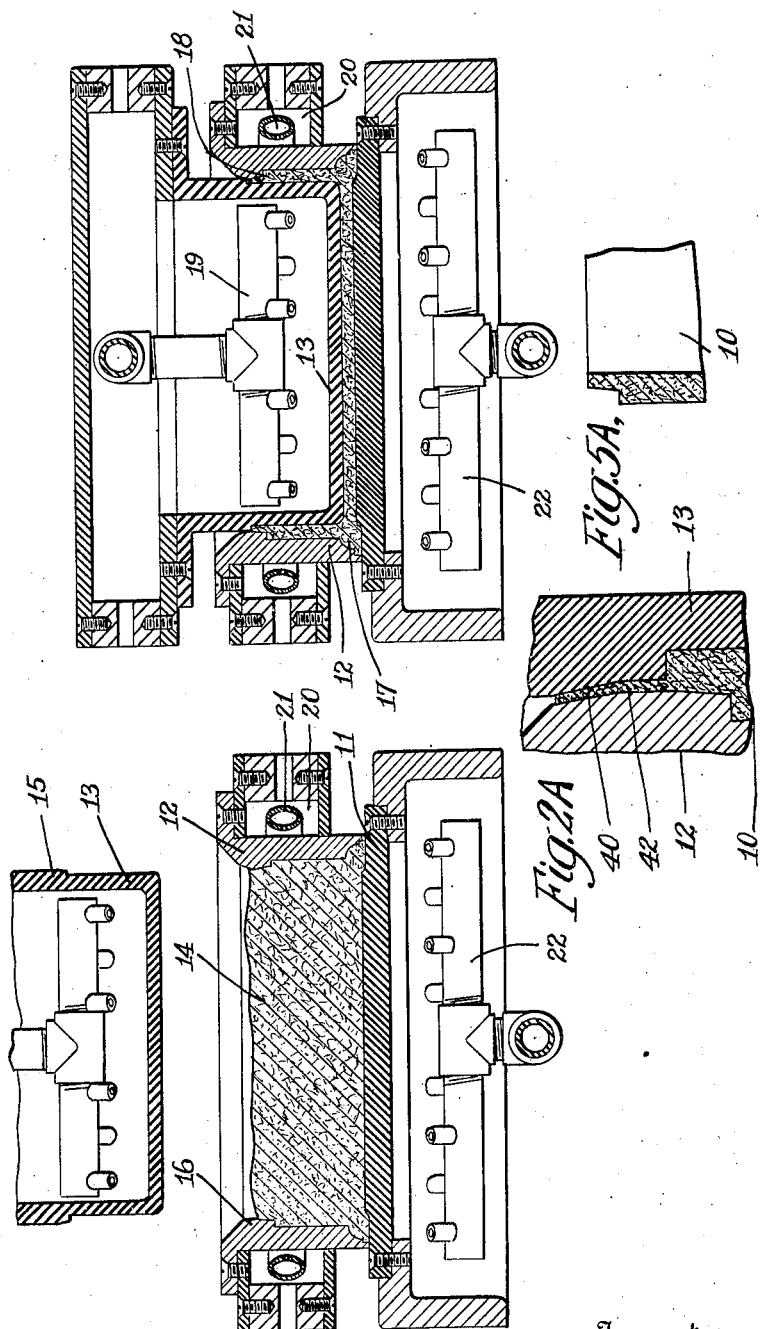

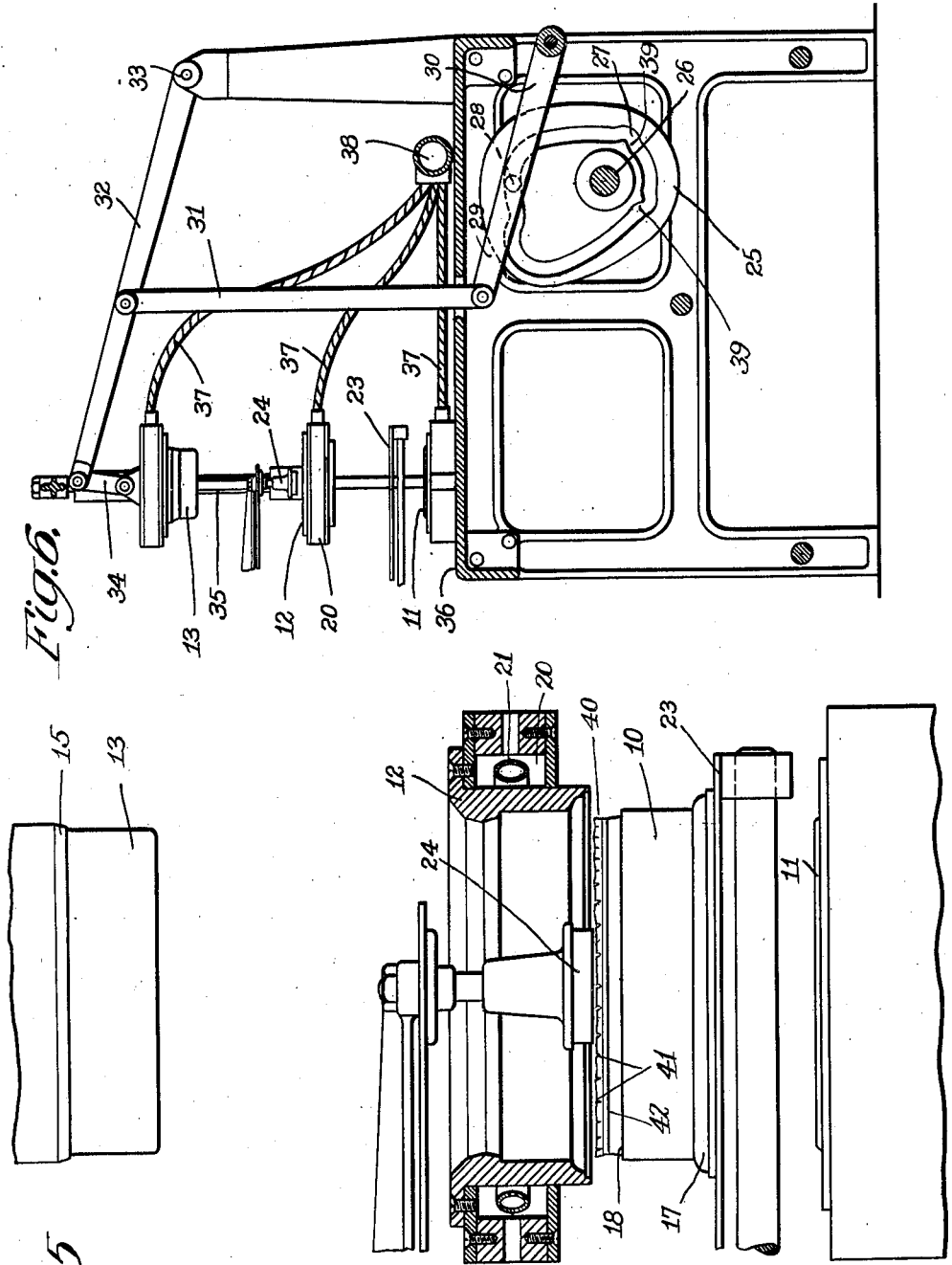

Patented Oct. 15, 1929

1,731,240

UNITED STATES PATENT OFFICE

WILLIAM APFELBAUM, OF NEW YORK, N. Y., ASSIGNOR TO THE PULPORE CAN & BOX CO., INC., OF NEW YORK, N. Y., A CORPORATION OF NEW YORK

APPARATUS FOR AND PROCESS OF MOLDING PLASTIC MATERIAL

Application filed July 2, 1920. Serial No. 393,529.

My invention relates particularly to the manufacture of boxes or containers from plastic material such as paper pulp or fiber.

The objects of the invention are to provide a practical and relatively simple and inexpensive method and apparatus for molding the plastic material to the desired shapes.

The invention involves a special mold of novel construction and a novel method of using the same.

Other features of the invention will appear as the specification proceeds.

In the accompanying drawings which form a part of this specification, I have illustrated a simple form of apparatus embodying the invention, but wish it understood that various changes and modifications may be made without departure from the true spirit and scope of the invention.

In the drawings referred to:

Figure 1 is a sectional view of the mold structure, showing the mold charged with the plastic material and the plunger or mold cover about to descend.

Figure 2 is a similar view, showing the plunger lowered to compress the material in the mold chamber.

Figure 2A is an enlarged fragmentary view of the upper portion of the mold.

Figure 3 is a sectional illustration, showing the plunger partly lifted to release the steam or vapors resulting from the molding operation.

Figure 4 is an illustration showing the mold parts separated and the discharge plunger in readiness to eject the molded product onto a carrying-off device.

Figure 5 is a further illustration of these last mentioned parts, showing the ejecting plunger as having operated to discharge the product from the mold onto the carrier.

Figure 5A is a fragmentary view of a portion of the molded box body.

Figure 6 is a vertical sectional view of a substantially complete embodiment of the molding machine.

The material ordinarily used is of a moist plastic nature which can be readily molded to various shapes and which as it dries hardens to permanent form. The drying is accomplished by heat applied to the mold and a special feature of the operation is the opening of the mold to release the steam or other vapors, generated in the molding process.

The apparatus disclosed is designed for the production of relatively shallow, substantially circular box bodies, such as indicated at 10 in Figures 4 and 5.

The mold is shown as made in three parts, a mold bottom 11, an annular wall 12 and a hollow plunger 13.

When the mold side wall is lowered onto the bottom, as indicated in Figure 1, a mold chamber is provided to receive the mass of plastic material 14, a measured quantity of which is introduced thereinto. The plunger 13 is of a diameter sufficiently less than the internal diameter of the surrounding annular mold body 12 to produce the desired wall thickness in the molded product and, similarly, the head of the plunger passes into the mold chamber only far enough to produce the desired bottom thickness of the molded product. In the illustration, the plunger has vertical side walls to form the box with an inner vertical wall and is provided with a beveled shoulder 15 cooperating with a correspondingly beveled shoulder 16 at the upper edge of the mold body.

It will be understood that these cooperating mold parts may be fashioned to produce any ornamental or desired box shapes. In the illustration, the mold bottom and the cooperating portion of the mold body are recessed and shaped to form an annular bead 17 at the base of the box and the mold body is shouldered at its upper edge to produce an annular shoulder 18 at the upper edge of the box.

A special feature of these mold parts is that they are each heated so as to dry out the material in the molding operation. Thus, the plunger is shown as of hollow construction and as containing a gas burner 19, the mold body is shown as constructed with an annular chamber 20 containing a burner ring 21 discharging against the adjacent mold wall and the mold bottom is shown as chambered to receive the gas burner 22.

The mold is usually worked quite hot, so that the outer surfaces of the material commence to dry and harden practically as soon as the body of material is charged into the mold cavity (Figure 1). The heated plunger, as it descends, compresses the material into the mold chamber and serves to dry the inner surfaces of the molded product (Figure 2).

The plunger may fit into the mouth of the mold body in such a way as to leave space for the escape of the steam and vapors freed by the drying material, but I propose to provide for the positive expulsion of such gases by partially withdrawing the plunger, one or a number of times, during the molding operation, as indicated in Figure 3. This allows for the repeated escape of the charges of steam and the plunger operates in a manner to force the steam in the cavity in the partially molded product out around the mouth of the mold body. This pumping action also serves to compact the material, producing a better texture and a stronger product.

When the material has sufficiently dried and assumed a permanent "set," the mold is opened by completely withdrawing the plunger and by relatively separating the mold body from the mold bottom, as indicated in Figure 4. This is accomplished in the machine illustrated by lifting the plunger out of the mold body and by lifting the mold body away from the mold bottom. In this step the upper edge of the molded object usually adheres to the mold body and is lifted therewith. The object is then ejected onto a suitable carrier 23 inserted in the space between the upraised mold body and the mold bottom by means of a suitable ejector, shown as a plunger 24 inserted in between the separated mold plunger and the mold body. This ejecting operation is particularly shown in Figure 5, wherein the ejecting plunger is shown at the limit of its downward movement and as having expelled the molded product from the chamber in the mold body.

In Figure 6 I have illustrated a machine for carrying out the operations described, the same comprising a cam 25 mounted on a driven shaft 26 and provided with a cam groove 27, receiving the roller 28 carried by the lever 29 which is pivoted at 30 and connected by a link 31 to a lever 32 pivoted at 33 and connected by a swinging link 34 with the mold plunger. The lever 32 is also connected by a lost motion connection 35 with the mold body 12 so that after a definite movement of the plunger, and, therefore, a predetermined separation of the plunger and mold body, depending upon the extent of lost motion, the mold body will be lifted away from the mold bottom. The mold bottom is shown as supported in fixed relation on the framing 36 of the machine and the three mold parts are shown as connected by suitable piping 37 with the gas main or other source of heat supply 38.

The ejector and carrying-off device are operated by suitable means not disclosed in this application.

The cam groove 27 is shown as constructed with two return throws or curves 39 for returning the plunger into the mold chamber after a partially withdrawing steam releasing movement. It will be understood that the cam may be constructed for as many steam releasing movements as may be found desirable or the mechanism for this purpose may be otherwise varied.

By means of the process and apparatus disclosed, I have been able to produce rapidly and economically, boxes and other molded objects which are strong and durable and useful for a great many purposes. I have in fact found it possible with this invention to produce containers of a much stronger and more durable and lasting construction than the ordinary pasteboard box and at a considerable saving over the cost of such boxes. These lasting qualities I attribute to a large extent to the manner in which the container is made and particularly to the features of drying the plastic wall, compacting the same and releasing the steam by one or more partial withdrawing movements of the molding plunger, or mold top. The separate heating devices in the mold parts enable the independent control of the heat or temperature in these different parts so as to get the best results.

An additional and important feature of the invention is the provision of special means for retaining the molded product in the mold body when the mold bottom separates therefrom. This feature is illustrated in detail in Figure 2A and consists in the formation of an outwardly flaring web or flange 40 at the upper edge of the box body which serves to support the box in the mold body when said mold body is separated from the mold bottom, as shown particularly in Figure 4. This web is provided by an excess of material, which is squeezed up around the mold plunger. Provision is thus made for the escape of excess material and this enables the use of sufficient material, in the first instance, to insure the production of walls of the required density and strength.

The construction described, therefore, enables the complete charging of the mold and provides a means for temporarily holding the article in the mold body, when the mold is opened.

The temporary supporting web or flange 40 is of a frangible nature and, therefore, yields to the force of the ejecting plunger when said plunger descends to force the article out of the mold body. In thus yielding, the web ordinarily cracks, after the manner indicated at 41 in Figure 5, leaving a series of more or less separated fingers at the upper edge of the article which can be easily broken off in finishing the upper edge of the article, which, ordinarily, is done by a grinding or cutting process.

To prevent the fractures (41) in the edge of the flange 40 from extending to or into the upper edge of the box body, said flange may be formed, as indicated particularly in Figure 2A, with a bend or elbow therein at 42, the lower portion of the flange being continued substantially straight up from the upper, outer edge of the box body, and the portion of the flange above the point 42 being flared outwardly as already described. With this design of flange, when the box is ejected, the fractures in the outwardly flaring supporting flange ordinarily will extend approximately to the point 42. In other words, said fractures will not extend to the plane of the final upper edge of the box.

The construction described furthermore provides a space at the upper edge of the mold cavity for the escape of the steam.

What I claim is:

1. In plastic molding apparatus, a separable open ended mold body, a mold bottom and a mold plunger cooperating to form a mold cavity of the desired configuration, means for relatively assembling and separating said mold parts and means independently heating each of said mold parts.

2. In plastic molding apparatus, a separable open-ended mold body, a mold bottom and a mold plunger cooperating to form a mold cavity of the desired configuration, means for relatively assembling and separating said mold parts and means for heating the mold parts during the molding operation.

3. In plastic molding apparatus, an open-ended mold body, a mold bottom and a mold plunger cooperating to form a mold cavity of the desired configuration, means for relatively assembling and separating the mold parts, said mold parts being of hollow construction, gas burners in said hollow mold parts and discharging against the molding walls thereof, and means for independently regulating said burners.

4. In plastic molding apparatus, an open-ended mold body, a mold bottom and a mold plunger cooperating to form a mold cavity of the desired configuration, means for relatively assembling and separating the mold parts, said mold parts being of hollow construction and independently regulatable gas burners in said hollow mold parts and discharging against the molding walls thereof.

5. In plastic molding apparatus, a mold body, a mold bottom and a mold plunger cooperating to form a mold cavity of the desired configuration, means for relatively assembling and separating the mold parts, said mold parts being of hollow construction, and independently regulatable heating devices in said hollow mold parts.

6. In plastic molding apparatus, a separable mold comprising a mold body, mold bottom and mold top, means for introducing the carrier beneath the mold body and means insertible between the mold top and the mold body and operable to expel the molded product from the mold body onto the carrier.

7. In plastic molding apparatus, a mold comprising a plunger, a body member and a base, means for moving said plunger into the body member and toward the base, a support movable between the base and body member and an ejector subsequently insertible in the body member and movable in the same direction as the operative movement of the plunger, to eject the molded product onto the support.

8. In plastic molding apparatus, a separable mold, comprising cooperating mold body, mold bottom and mold top, means for relatively moving said mold top and mold body into separated relation, a carrier adapted to be moved beneath the mold body and between said mold body and the mold bottom and an ejector movable between the mold top and mold body for expelling the molded product from the mold body onto the carrier.

9. In plastic molding apparatus, a mold comprising relatively separable mold body, mold bottom and mold top, means for supporting the same, a carrier for the mold product movable between the mold body and mold bottom and an ejector movable to a position between the mold top and mold body and operable to expel the molded product from the mold body onto the carrier.

10. In plastic molding apparatus, a mold comprising a mold body, a plunger operating therein, a mold bottom, means for separating the mold body, the plunger and mold bottom, a carrier movable to a position between the mold body and mold bottom and an ejector insertible between the withdrawn plunger and the mold body and operable to eject the molded product from the mold body.

11. The process of molding moist plastic material which comprises compressing the material with the application of heat to the desired configuration and temporarily partially releasing the pressure during the molding operation.

12. The process of molding which includes compressing the material within a separable mold and forming a flaring web on the molded article overlapping one of the parts of the separable mold to retain the article therein when the mold parts are separated and subsequently fracturing said flaring web to release the article from the mold part.

13. The process of molding which includes compressing the material in a separable mold and forming on the molded article a temporary supporting web having a portion forming a substantially straight continuation of the wall of the molded article and another flaring portion overlapping one of the parts of the separable mold to temporarily support the article therein when the mold is separated.

14. The process of molding which includes compressing the material in a separable mold and forming on the molded article a temporary supporting web having a portion forming a substantially straight continuation of the wall of the molded article and another flaring portion overlapping one of the parts of the separable mold to temporarily support the article therein when the mold is separated and subsequently fracturing the flaring portion of the web substantially to the straight portion thereof to thereby free the article from the mold part.

15. In apparatus of the character described, separable mold parts having means constructed to produce an article having a flaring flange overlying one of the mold parts to temporarily hold the article thereto when the mold is separated and means for ejecting said article from said mold part having portions engageable with the flange to cause the flaring flange to yield and collapse to permit disengagement of the article from the mold part.

16. In plastic molding apparatus, a mold transversely smaller at one of its ends than at the other, closures for said ends, mechanism for separating said mold and its closures, an object support, insertible between the larger end of the mold and the respective closure while said mold parts are in separated relation, and an ejector movable between the smaller end of the mold and the closure therefor for ejecting the product from the mold onto the support.

17. In plastic molding apparatus, a mold transversely smaller at one of its ends than at the other, closures for said ends, mechanism for separating said mold and its closures, and an ejector, insertible between the smaller end of said mold and the respective closure when said mold parts are in separated relation.

18. In plastic molding apparatus, a mold transversely smaller at one of its ends than at the other, closures for said ends, mechanism for separating said mold and its closures, an object support, an ejector, said object support being insertible between the larger end of the mold and the respective closure and said ejector being insertible between the smaller end of said mold and the respective closure.

19. In plastic molding apparatus, a three part separable mold, means for separating the parts of the mold, and an object support, insertible after a predetermined period after separation of said parts between two parts of said mold, said mold being arranged to form an object having an overlapping web for supporting the object in one of said last named parts during said period.

20. In plastic molding apparatus, a three part mold, means for separating the parts of the mold, an object support, and insertible between two of the parts of the mold after a predetermined period after said mold parts are separated, said mold being arranged to form an object having an overlapping web for supporting the object in one of said last named mold parts until the support is positioned.

21. In plastic molding apparatus, a mold comprising an open-ended mold body and closures for the respective ends thereof, means for separating the closures from the body, an object support, movable to a position between the mold body and one of said closures after said separating means has operated, said mold being constructed to form an object having a flaring overlapping web whereby the object is maintained in the mold body until the support is positioned.

22. In plastic molding apparatus, a three part separable mold, means for separating the parts of the mold, an object support, said support being movable to a position between two parts of said mold, said mold being arranged to form an object having an overlapping web for supporting the object in one of said last named parts during said period, and an ejector arranged to displace the object.

23. In plastic molding apparatus, a three part mold, means for separating the parts of the mold, an object support movable to a position between two of the parts of the mold after a predetermined period after said mold parts are separated, said mold being arranged to form an object having an overlapping web for supporting the object in one of said last named mold parts until the support is positioned, and an ejector arranged to displace the object.

24. In plastic molding apparatus, a mold comprising an open-ended mold body and closures for the respective ends thereof, means for separating the closures from the body, an object support insertible between the mold body and one of said closures operative after said separating means has operated, said mold being constructed to form an object having a flaring overlapping web whereby the object is maintained in the mold body until the support is positioned, and an ejector arranged to displace the object.

25. In plastic molding apparatus, a separable mold comprising a mold body, mold bottom, and mold top, said parts being relatively movable, and means for ejecting the product, said ejecting means being movable to a position between the mold top and the mold body and adapted to expel the molded product from the mold body.

26. In a machine for making die-molded articles of plastic material, in combination, a three-part mold comprising a mold top, a mold body, and a mold bottom, means for separating the three parts of the mold to permit ejection of the molded article, a reciprocating carrier movable into and out of the space between two of said parts after separation thereof, and an ejector to expel the article from one of the mold parts upon the carrier.

In witness whereof, I hereunto set my hand this 30th day of June, 1920.

WILLIAM APFELBAUM.